May 2, 1967
G. E. GREY ETAL
3,317,062
BALE WAGON SUPPORT
Filed April 6, 1965
2 Sheets-Sheet 1
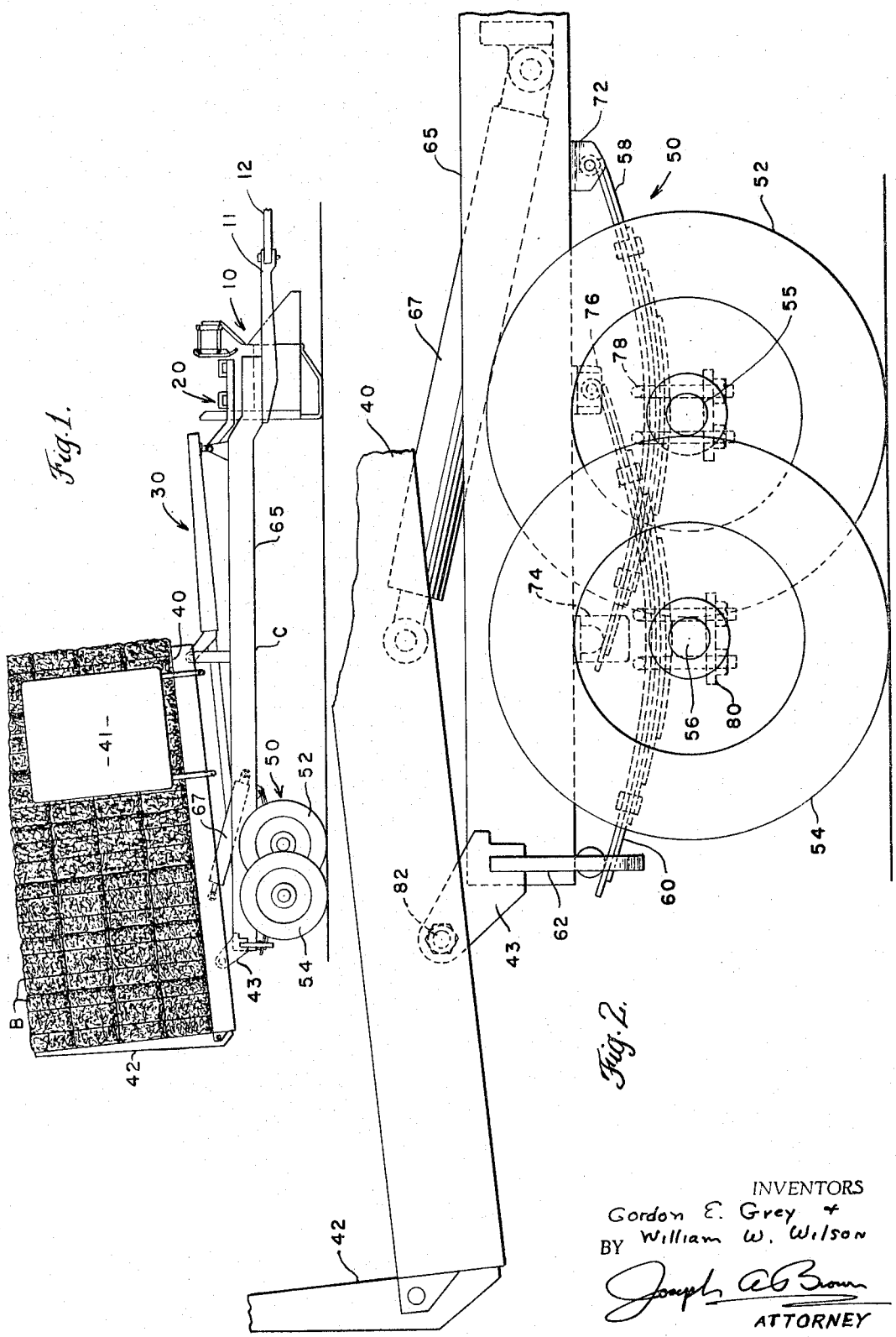
INVENTORS
Gordon E. Grey +
BY William W. Wilson
Joseph A. Brown
ATTORNEY

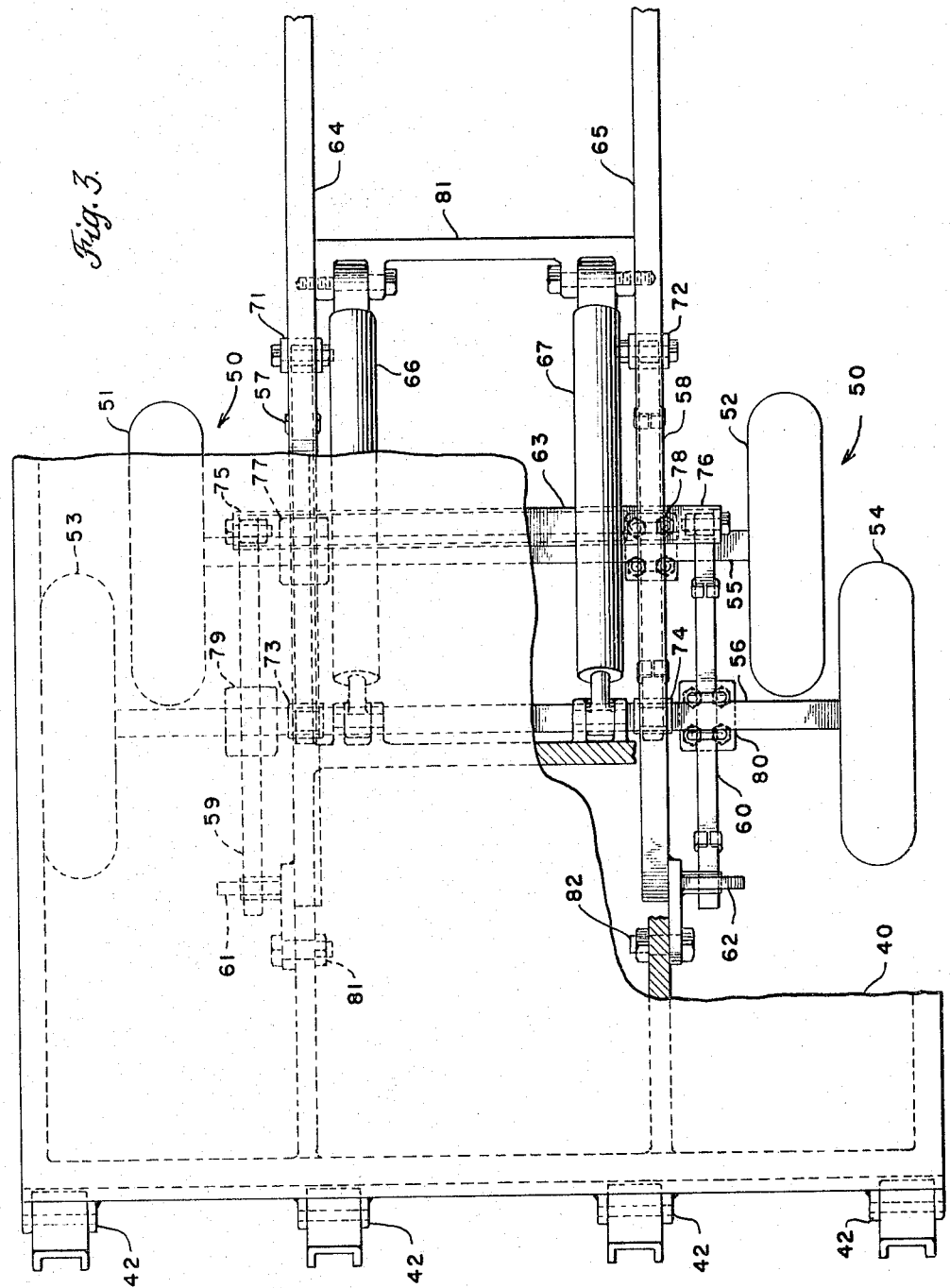

3,317,062
BALE WAGON SUPPORT
Gordon E. Grey, Kingsburg, and William W. Wilson, Selma, Calif., assignors to Sperry Rand Corporation, New Holland, Pa., a corporation of Delaware
Filed Apr. 6, 1965, Ser. No. 446,053
3 Claims. (Cl. 214—6)

This invention relates generally to bale wagons or vehicles intended to handle baled products such as baled hay. More particularly, the invention relates to improvements in a suspension system for a bale wagon, for example of the type disclosed in U.S. Patent No. 2,848,127.

The bale wagon disclosed in the patent noted above is provided with a wheel supported chassis, a bale loader on the forward end of the chassis, a receiving bed adjacent the loader, a transfer bed on the chassis rearwardly of the receiving bed, and a load-carrying bed on the chassis rearwardly of the transfer bed. Bales are loaded on the receiving bed which deposits them on the transfer bed, two bales at a time. When the transfer bed has accumulated a layer of bales, two bales across and four bales in length, the bed is pivoted upwardly to deposit the bales on the load-carrying bed and form a vertical stack of bales thereon. After the load-carrying bed is full of abutting vertical stacks, the bed is adapted to mechanically deposit its entire load on the ground.

As the load-carrying bed is being filled, the bales on the bed are supported rearwardly by longitudinally movable vertical bars. Support means are also provided on each side of the bed to keep the bales from moving or falling laterally. The forward end of the bale load is not supported because of the manner in which the bales are loaded on the load-carrying bed. The load-carrying bed is inclined toward the rear which helps to keep the bales from falling forwardly. It has been found, however, that under certain field conditions, for example where the field has irrigation ditches which have to be crossed, bales in the forward stack of bales on the load-carrying bed will at times fall forwardly. This usually occurs when one or both wheels hit an obstruction or drop into a ditch.

Accordingly, one object of this invention is to provide a bale wagon of the character described with an improved suspension system which will increase the stability of the wagon and thereby reduce the likelihood of bale stacks falling over.

Another object of this invention is to provide a bale wagon with a suspension system having two independent chassis suspension units.

Another object of this invention is to provide a bale wagon with a load-carrying bed which is maintained in a substantially normal position under various types of field conditions.

A further object of this invention is to provide a bale wagon which is adapted to perform efficiently in hay fields which have been ditched for irrigation.

A still further object of this invention is to provide a bale wagon with increased support on the rear end whereby the wagon stability is increased while the load-carrying bed is being unloaded.

Other objects of this invention will be apparent hereinafter from the specification and from the recital in the appended claims.

In the drawings:
FIG. 1 is a side view showing a bale wagon having a suspension system constructed according to this invention.
FIG. 2 is a fragmentary side view on an enlarged scale showing the suspension system in detail.
FIG. 3 is a plan view of FIG. 2 on a reduced scale.

Referring now to the drawings by numerals of reference, the bale wagon of this invention is shown generally in FIG. 1. The wagon comprises a chassis C, a bale loader 10 mounted on one side of the chassis forward end portion, a receiving bed 20 adjacent the bale loader, a transfer bed 30 pivotally mounted behind the receiving bed, a rearwardly inclined load-carrying bed 40 on the rear end of the chassis, and a suspension system 50. The forward end of the chassis is provided with a hitch bar 11 connected to a tractor drawbar 12, shown fragmentarily.

With particular reference to FIGS. 2 and 3, the suspension system 50 consists of a forward suspension unit and a rear suspension unit. The forward suspension unit comprises wheels 51, 52 mounted on axle 55 and spaced on opposite sides of chassis C, and leaf springs 57, 58 connected to axle 55 by mounting brackets 77 and 78. Leaf springs 57, 58 are secured to chassis frame members 64 and 65 by conventional mounting means, as shown at 72, 74 on frame member 65 and at 71, 73 on frame member 64.

The rear suspension unit comprises wheels 53, 54 mounted on rear axle 56 and leaf springs 59, 60 connected to axle 56 by mounting brackets 79 and 80. A laterally extending frame element 63 is located forwardly of rear axle 56 and serves as a support for the forward ends of leaf springs 59 and 60. The rear ends of springs 59, 60 are connected to the frame members by support brackets 61 and 62. Rear axle 56 is spaced slightly more than a wheel radius from front axle 55, as shown in FIG. 3. The rear wheels are located closely adjacent the front wheels and are spaced laterally outward therefrom. Thus, adjacent wheels on each side of the chassis have an overlapping relationship when the bale wagon is viewed from the side.

In operation, bales are loaded onto the receiving bed 20 by bale loader 10. The receiving bed deposits bales on transfer bed 30, two bales at a time. When the transfer bed has accumulated a layer of bales, two bales across and four bales in length, the bed is pivoted upwardly to deposit the bales on the load-carrying bed 40 and form a vertical stack of bales B thereon. Successive vertical stacks of bales are placed on the load-carrying bed until it has been filled. As the load-carrying bed is being filled, the bales are supported rearwardly by movable bars 42, which progressively shift rearwardly as stack after stack of bales are loaded on the carrying bed 40. Support is provided on each side of the load-carrying bed by panels 41, but the forward portion of the stack is unsupported. To unload the load-carrying bed, the rear end is pivoted downwardly about pivots 81, 82 by hydraulic cylinders 66 and 67. The bale wagon is moved forward, with the bed in a vertical position, to withdraw bars 42 from under the bale stack.

It will be apparent from the foregoing, that the load-carrying bed must be maintained in its normal inclined position (see FIG. 1) while it is being filled, if the wagon is to function efficiently. If any of the bales in the front vertical stack of the load topple forwardly, the operator must stop and re-arrange the bales. The wagon stability is greatly increased both in the longitudinal direction and in the transverse direction by the novel suspension system disclosed herein. Since each of the suspension units functions independently of the other, a hole or obstruction encountered by the wheels of one of the units does not materially affect the position of the load-carrying bed.

In addition to the advantages provided by this invention while the bale wagon is being loaded, the disclosed suspension system also serves to increase the wagon stability when the load-carrying bed is being unloaded. Any shifting of the chassis while the load-carrying bed is being pivoted to an unloading position might cause the load to topple over. The two suspension units are so located that the chassis is maintained in a substantially horizontal position during this pivoting movement and unloading of the load-carrying bed.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the limits of the appended claims.

Having thus described our invention, what we claim is:

1. A bale wagon comprising a wheel supported maneuverable chassis adapted to travel forwardly, said chassis having first and second substantially horizontal longitudinally extending frame members arranged in spaced side-by-side relationship and forming the lateral extremities of said chassis, an inclined load-carrying bed on said chassis and having its lowest point rearwardly, said load-carrying bed being adapted to receive a series of vertical stacks of bales with their longitudinal axes transverse to the direction of travel, said bales being supported rearwardly and the first stack of the series being unsupported forwardly, a suspension system supporting said chassis comprising in combination a first unit and a second unit, said first unit having a transverse forward axle which extends laterally beyond said first and second frame members, a first front wheel on said forward axle adjacent said first frame member and a second front wheel on said forward axle adjacent said second frame member, said second unit comprising a rear axle parallel to said forward axle and extending laterally beyond said frame members, a first rear wheel on said rear axle adjacent to and laterally offset from said first front wheel, a second rear wheel on said rear axle adjacent to and laterally offset from said second front wheel, a first front spring mounted between said first frame member and said forward axle, a second front spring mounted between said second frame member and said forward axle, a transversely extending frame element connected to said first and second frame members and located forwardly of said rear axle, a support bracket mounted on each of said frame members rearwardly of said frame element, a first rear spring spaced laterally outwardly of said first front spring and connected to said frame elements and to one of said support brackets, a second rear spring spaced laterally outwardly of said second front spring and connected to said frame element and to the other of said support brackets, said rear springs being mounted on said rear axle, and each of said units functioning independently of the other whereby the stability of the wagon chassis is maintained and the chassis will remain substantially horizontal when supported by both units or by either of said units.

2. A bale wagon comprising a maneuverable chassis adapted to travel forwardly, a bed means on said chassis, means on said wagon to form stacks of bales on said bed means, means on said wagon to transfer said stacks to a load-carrying portion of said bed means, means on said wagon to unload said bales, a suspension system supporting said chassis consisting of a first suspension unit and a second suspension unit, said first suspension unit including a first axle and a first pair of wheels mounted thereon and spaced on opposite sides of said chassis, said second suspension unit including a second axle and a second pair of wheels mounted thereon adjacent said first pair of wheels and laterally offset outwardly therefrom, said second axle being spaced less than one wheel diameter from said first axle a front spring mounted between said first axle and said chassis adjacent each of the wheels in said first pair of wheels, a pair of rear springs mounted between said second axle and said chassis adjacent each of the wheels in said second pair of wheels, and said rear springs being laterally offset, outwardly from said front springs.

3. A bale wagon comprising a wheel supported maneuverable chassis adapted to travel in a forward direction, said chassis having first and second substantially horizontal longitudinally extending frame members arranged in spaced side-by-side relationship, a load-carrying bed on said chassis, said load-carrying bed being adapted to receive a series of vertical stacks of bales, a suspension system supporting said chassis comprising in combination a first unit and a second unit, said first unit having a forward transverse axle which extends laterally beyond said first and second frame members, a first front wheel on said forward axle adjacent said first frame member and a second front wheel on said forward axle adjacent said second frame member, a first front spring mounted between said first frame member and said forward axle, a second front spring mounted between said second frame member and said forward axle, said second unit comprising a rear axle parallel to said forward axle and extending laterally beyond said frame members, a first rear wheel on said rear axle adjacent to and laterally offset outwardly from said first front wheel, a second rear wheel on said rear axle adjacent to and laterally offset outwardly from said second front wheel, a first rear spring mounted between said chassis and said rear axle and spaced laterally outwardly from said first front spring, a second rear spring mounted between said chassis and said rear axle and spaced laterally outwardly from said second front spring, the spacing between said forward and rear axles being less than the diameter of any of said wheels, each of said units functioning independently of the other whereby the stability of the wagon chassis is maintained and the chassis will remain substantially horizontal when supported by both units or by either of said units.

References Cited by the Examiner

UNITED STATES PATENTS

| | | | |
|---|---|---|---|
| 1,928,900 | 10/1933 | Knox | 280—104.5 |
| 2,596,035 | 5/1952 | Love | 280—104.5 X |
| 2,848,127 | 8/1958 | Grey. | |
| 3,087,741 | 4/1963 | De Lay | 280—81 |

GERALD M. FORLENZA, *Primary Examiner.*

ALBERT J. MAKAY, *Examiner.*